Aug. 6, 1940.                    J. F. BARRY                    2,210,520
                              WIRE CONNECTING DEVICE
                              Filed April 23, 1938                2 Sheets-Sheet 1
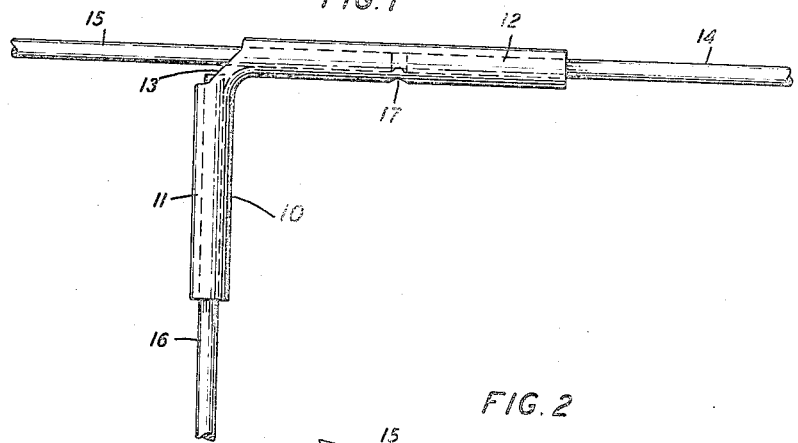
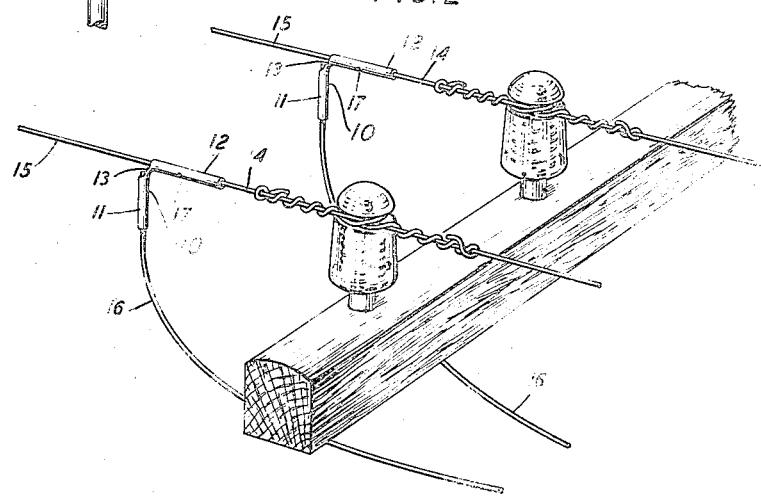
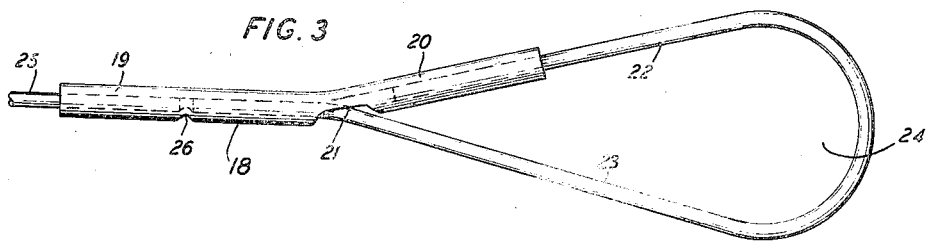
INVENTOR
J. F. BARRY
BY J. MacDonald
ATTORNEY Aug. 6, 1940.   J. F. BARRY   2,210,520
WIRE CONNECTING DEVICE
Filed April 23, 1938   2 Sheets-Sheet 2

INVENTOR
J. F. BARRY
BY J. MacDonald
ATTORNEY

Patented Aug. 6, 1940

2,210,520

UNITED STATES PATENT OFFICE 2,210,520

WIRE CONNECTING DEVICE

Joseph F. Barry, Brooklyn, N. Y., assignor to Bell Telephone Laboratories, Incorporated, New York, N. Y., a corporation of New York Application April 23, 1938, Serial No. 203,772

3 Claims. (Cl. 287—75)

This invention relates to a method and means for joining wires, and more particularly to a means for making joints and connections in conductors or wires used for communication purposes.

Heretofore it has been the established practice, in making joints in conductors for communication purposes and the making of connections thereto, to join the wires together by means of a single or double sleeve in which the wires were firmly secured and to make the branch connection thereto independent of the wire joining means.

It is the object of the present invention to provide, in a single unitary structure, a means for joining together a plurality of wires which are in angular relation.

The wire connecting device of this invention consists of a tubular member having angularly related portions, said portions comprising complete tubes and an opening in the wall of said member at the junction of said portions, said opening being in alignment with the passage through one of said portions, and being of such size as to leave more than half of the cross-section of the tubular member remaining at said junction. This may be accomplished by any suitable means, for example, rolling, as disclosed in Patent 1,863,048 issued June 14, 1932, to W. S. Hayford.

These and other features of the invention will be more readily understood from the following detailed description made with reference to the accompanying drawings, in which:

Fig. 1 is a side view of the wire joining means of this invention;

Fig. 2 is a fragmentary view, in perspective, showing the device of Fig. 1 connected to a pair of line wires for the purpose of making connections thereto;

Fig. 3 is a top view of a modified form of the connector shown in Fig. 1 and illustrates how the wires may be secured therein to form a loop;

In accordance with my improved method and means for connecting together a plurality of wires, I provide, as shown in Figs. 1 to 4, inclusive, a tubular metallic sleeve bent intermediate its ends to provide angularly related portions. Adjacent the bent portion of the sleeve is an opening which forms a passageway into the central bore of the sleeve and permits access thereto.

Figure 7:
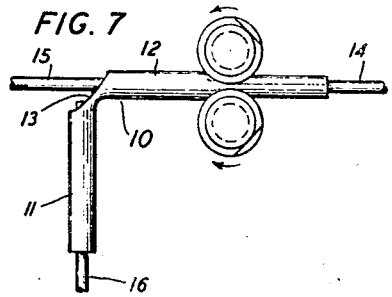
Fig. 7 illustrates a suitable method of forcing the sleeve into intimate contact with the wire.

As shown in Figs. 1 and 2, a tubular metallic sleeve 10 is bent intermediate its ends, at an angle of approximately 90 degrees to provide the portions 11 and 12. Adjacent the bent portions of the sleeve 10 is an opening 13 which provides a means of access to the central bores of the portions 11 and 12. The portion 12 is of sufficient length to receive the ends of the wires 14 and 15 and the portion 11 is of such a length to receive the end of the wire 16. After the ends of the wires have been inserted in their respective bores, the portions 11 and 12 are forced into intimate contact therewith to securely hold the wires in place. Any suitable means may be used for forcing the sleeve into intimate contact with the inserted wires, for example, by rolling as shown in Fig. 7.

In some instances where it is desirable to permit an unbroken length of wire to pass through one of the angular portions 12 of the sleeve, the indentations 17 which ordinarily forms a stop for the wires 14 and 15 is omitted. This permits a line wire to be threaded through the bore of the portion 12.

Figure 4:
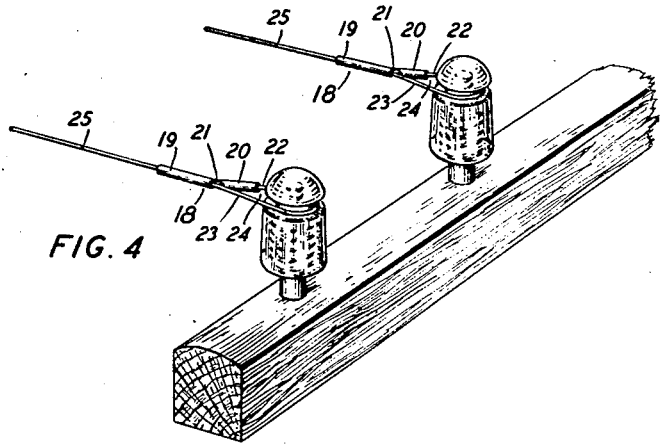
Fig. 4 is a fragmentary view, in perspective, illustrating how the device of Fig. 3 is used as a "dead end" connection.

In Figs. 3 and 4 there is shown a device which is somewhat similar to the device shown in Figs. 1 and 2 but which differs therefrom in that the sleeve 18 is bent, intermediate its ends, at an angle somewhat less than 90 degrees. This provides the sleeve 18 with the angularly related portions 19 and 20. Adjacent the bent portion of the sleeve 18 is an opening 21 which permits the insertion of wires into the bore of the portion 19.

As shown in Fig. 3 the ends 22 and 23 of the wire which forms the loop 24 and the end 25 of the line wire are positioned in the bores of the portions 19 and 20. The end 22 is located in the short portion 20 and the ends 23 and 25 are positioned in abutting relationship in the bore 19 and engage the indentation or stop 26.

In some instances where it is desirable to form the loop 24 from a continuous piece of wire;

that is, from the same length of wire which comprises the line wire, the indentation 26 is omitted and the line wire is threaded through the bore of the portion 19 and bent back upon itself to provide a loop, the end 22 of which will be positioned in the bore 20 as shown. After the ends of the wires 22, 23 and 25 have been positioned in their respective bores of the sleeve 18, the sleeve is forced into intimate contact with the wires to firmly secure them therein. This may be accomplished as heretofore described with respect to the wire connecting device shown in Figs. 1 and 2.

Figure 5:
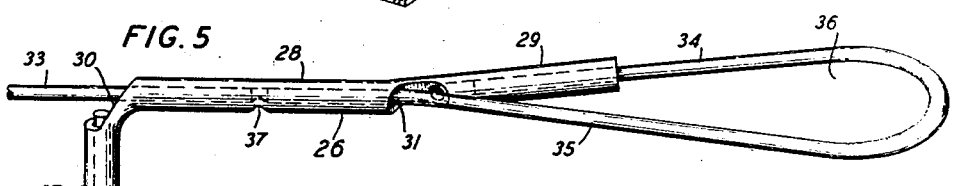
Fig. 5 shows an additional modified form of the invention in which the devices of Fig. 1 and Fig. 3 have been combined to provide a means for "dead-ending" a line wire and making a connection thereto.
Figure 6:
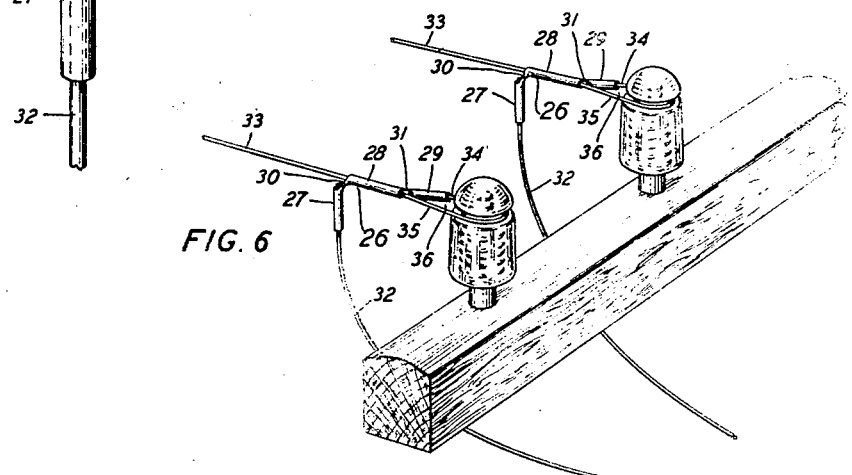
Fig. 6 is a fragmentary view in perspective illustrating how the device of Fig. 5 is used as a dead end connection for a pair of line wires and also to provide drop or bridle wire connections thereto.

In Figs. 5 and 6 there is illustrated a further modification of the invention in which the devices of Figs. 1, 2, 3 and 4 have been combined to provide, in a single unitary structure, a means for dead-ending a line wire and making a branch wire connection thereto.

In Fig. 5 the sleeve 26 is provided with three angular portions 27, 28 and 29. The portion 27 is at an angle of approximately 90 degrees with respect to the portion 28 and the portion 29 is at an angle somewhat less than 90 degrees with respect to the portion 28. Adjacent each of the bent portions 27 and 29 are the openings 30 and 31 which permit ready access to the central bores thereof and permit the ends of the wires 32, 33, 34 and 35 to be inserted therein. In this figure the loop 36 is formed by the ends of the wires 34 and 35 being positioned in the portions 28 and 29. The end 35 of the loop 36 is in abutting relationship with the end of the line wire 33 which is positioned in the portion 28, both of said wires being in abutting relationship and engaging the indentation 37. The branch wire 32 is positioned in the portion 27 to provide means of connection to the line wire 33. The ends of the wires 32, 33, 34 and 35 are secured in the sleeve 26 as heretofore described with reference to the other figures.

Like the devices heretofore described the loop 36 may be formed by a portion of the line wire 33. This is accomplished by the omission of the indentation 37 and passing the line wire 33 through the bore of the portion 28, bending the wire back upon itself and positioning it in the bore 29.

It will be noted that the devices of applicant's invention are all formed from short lengths of metallic tubing and that either of the forms shown in Figs. 1 and 2 or 3 and 4 may be obtained by eliminating from the form shown in Figs. 5 and 6 the unwanted portions. For example, if it is desired to make a connection to a wire as shown in Figs. 1 and 2, the bent portion 29 of Fig. 5 may be broken off. Likewise if it is desired to provide simply a dead-end connection as shown in Figs. 3 and 4, the tail portion 27 may be broken off.

While the applicant has shown and described preferred forms of his invention, it is understood that variations and modifications may be made therein without departing from the spirit of the invention and he is only limited by the appended claims.

What is claimed is:

1. A wire connecting device comprising a tubular member having angularly related portions, said portions comprising complete tubes and an opening in the wall of said member at the junction of said portions, said opening being in alignment with the passage through one of said portions, and being of such size as to leave more than half of the cross-section of the tubular member remaining at said junction.

2. A wire connecting device comprising a member formed from a single length of tubing and having at least two angularly related portions, said portions being completely tubular, thus forming passages, and being joined by an integral connecting portion of a cross-section more than half the cross-section of said tubular member, thus providing an opening at the junction of said portions, such opening being in alignment with the passage through one of said portions, whereby a wire may be inserted in one of said passages and be caused to extend through said opening.

3. A "dead end" comprising a tubular member formed from a single length of tubing and having angularly related portions, an opening in the wall of said member at the junction of said portions, said opening being in alignment with the passage through one of said portions, and a wire having a portion extending through said passage and opening, and a portion extending beyond said opening and looped in such manner that the return end thereof is disposed in the other portion of said tubular member; said opening being of such size as to leave more than half of the cross-section of the tubular member remaining at said junction, and portions of said angularly related portions of the tubular member being compressed about the wire disposed therein.

JOSEPH F. BARRY.